United States Patent Office 2,883,319
Patented Apr. 21, 1959

2,883,319

PESTICIDES

Abraham Bavley, Brooklyn, and Donald P. Cameron, Bronx, N.Y., assignors to Chas. Pfizer & Co., Inc., Brooklyn, N.Y., a corporation of Delaware No Drawing. Application July 2, 1957
Serial No. 669,453

11 Claims. (Cl. 167—22)

This invention is concerned with a new class of pesticides valuable in combating insects and particularly useful as acaricidal agents (miticidal agents). More particularly, it is concerned with certain 2-dialkylthionophosphonothio and 3-dialkylthionophosphonothio substituted ethyl and propyl fully esterified esters of certain di- and tricarboxylic acids to be described more fully hereinafter.

The wide-spread and effective use of insecticides has given rise to a new problem, that is the control of mites, has progressed to the point where various species of mites formerly considered serious pests only occasionally, or in restricted areas, have caused grave injury each season to many economically important crops. The compounds of this invention are unusually effective in the control of mites. These compounds are 2-dialkylthionophosphonothio substituted ethyl and 3-dialkylthionophosphonothio substituted propyl fully esterified esters of di- and tricarboxylic acids, the carboxyl groups of said acids being attached to different carbon atoms of a straight chain residue containing up to four carbon atoms and selected from the group consisting of alkyl, alkylene and monohydroxylated alkyl, and alkylene, the alkyl groups of said dialkylthionophosphonothio substitutents containing up to four carbon atoms. Among the acids whose derivatives are included within the purview of this invention are maleic, fumaric, malonic, succinic, glutaric, adipic, itaconic, aconitic, citraconic, citric and tricarballylic.

The itaconic acid compounds of this invention can be illustrated by the following formula:

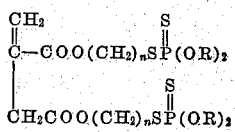

wherein $n$ is one of the integers two and three, and R is an alkyl group containing up to four carbon atoms. R and $n$ have these same meanings when the acid moiety is an acid of this invention other than itaconic, i.e., maleic, succinic, etc.

The choice of starting compounds used in the preparation of the products of this invention will depend on whether it is desired to prepare a derivative of an ethyl or a propyl ester. For an ethyl ester, the most desirable starting compound is a fully esterified β-haloethyl ester of the selected polycarboxylic acid, preferably a β-chloroethyl ester. For a propyl ester derivative, the most desirable starting compound is a fully esterified allyl ester. When the terms, "β-haloethyl ester, allyl ester, ethyl ester or propyl ester" are used hereinafter, it is to be understood that reference is made to a fully esterified di- or tricarboxylic acid, that is one with no free carboxyl groups.

The above starting compounds as used in the preparation of the products of this invention can be readily prepared by a number of procedures as will be apparent to those skilled in the art. It has been found that the β-haloethyl esters are very readily prepared by the reaction of a halohydrin, for example, chlorohydrin with the chosen acid using conventional Fischer esterification procedures. Fischer esterification procedures can be similarly employed for the preparation of allyl esters by the reaction of allyl alcohol with the chosen acid.

A metathetical reaction between an ammonium or metallic salt of dialkyldithiophosphoric acid, preferably the ammonium or alkali metal salt, and a β-haloethyl ester provides the valuable dialkylthionophosphonothioethyl esters of the instant invention. This reaction is conveniently carried out by contacting the chosen β-haloethyl ester with the chosen salt in a lower, aliphatic, oxygenated solvent such as the lower alkanols and ketones containing up to six carbon atoms at a temperature of from about 60° C. to about 150° C. for a period of from about fifteen minutes to about six hours. It may be advantageous to use as much as a fifty percent excess, or even more, of the dialkyldithiophosphoric acid to insure high yields, but it is not necessary to do so, since an equivalent quantity of the acid provides quite good yields. It is most convenient to select a solvent which, at atmospheric conditions, boils within the preferred temperature range of from about 80° C. to about 110° C. and to reflux the mixture for the preferred reaction period of from about thirty minutes to about two hours. During the reaction period the by-product inorganic salt, for example sodium chloride usually precipitates from the mixture and this can be removed by filtration.

The valuable product can be recovered in any convenient manner, for example solvent extraction or removal of the solvent in vacuo. The compounds of this invention are so active as pesticidal agents that it is not necessary to use them in a highly purified form, therefore, in most instances, the product will be recovered by simply removing the solvent in vacuo. It may be desirable to filter the residue before use to remove the last traces of inorganic salt.

If a highly purified product is desired this can be readily obtained. For example, the less pure product can be taken up in a water immiscible solvent or a mixture of solvent, say for example, aliphatic or aromatic hydrocarbon solvents containing up to ten carbon atoms or a mixture of these with dialkyl ethers containing up to eight carbon atoms. The solution is then washed with water, dried and the solvent removed in vacuo. The residue from the washed solution can be further purified by conventional means, for example, recrystallization or vacuum distillation.

A dialkyldithionophosphonothiopropyl ester of this invention can be prepared by reaction between an allyl ester and a dialkyldithiophosphoric acid. This reaction is carried out by contacting the chosen ester with at least an equivalent proportion of the chosen acid in an inert organic solvent, for example, lower aliphatic or aromatic hydrocarbon solvents containing up to ten carbon atoms, and their halogenated analogs, at a temperature of from about 60° C. to about 180° C., for from about six to about thirty-six hours. Suitable solvents include heptane, octane, benzene, toluene, the xylenes, chloroform, carbon tetrachloride, chlorobenzene, etc. It is most convenient to select a solvent which, under atmospheric conditions, boils within the preferred temperature range of from about 80° C. to about 120° C., and to reflux the mixture for the preferred time of from about sixteen to about thirty hours.

The product can be recovered from the reaction mixture by any convenient method. As with the ethyl analogs, the propyl compounds are so active that it is not necessary to employ the highly purified compounds, and hence the compound will most often be isolated by removing the solvent in vacuo. It is best to neutralize any excess acid by washing the reaction mixture with an aqueous alkaline reagent, for example, the hydroxides, carbonates or bicarbonates of the alkali or alkaline earth metals, prior to removing the solvent. The neutralization is usually preceded and followed by an aqueous wash. The reaction mixture is best dried before stripping the solvent in vacuo, and this can be accomplished by the use of an anhydrous dyring agent, such as sodium or magnesium sulfate. It may be convenient to choose a solvent which forms an azeotropic mixture with water, and to dry the reaction mixture by azeotropic distillation.

The highly purified product can be obtained by the same procedure used for preparing the purified ethyl analog.

If saturated acid esters are used in carrying out the above described reaction, it may be advantageous to use as much as a fifty percent excess, or even more, of the dialkyldithiophosphoric acid to insure high yields, but it is not necessary to do so, since an equivalent quantity of the acid provides quite good yields. However, if unsaturated acid esters such as diallyl itaconate are used it is best to use not much more than an equimolar proportion of acid since some of it may add to the unsaturated chain of the acid.

The compounds of this invention have been tested in standard miticidal tests including those in which their miticidal action against Tetranychus bimaculata, commonly known as the two-spotted spider mite, was tested. This particular mite causes extensive damage to both hothouse and open air groups. It is a general feeder but is particularly troublesome with such groups as cucumbers, tomatoes, roses, chrysanthemums, fuschias and ageratums. It is a major problem on roses. When it is not controlled, it limits production of edible crops and makes flowers unsalable. It has become increasingly prevalent in orchards, particularly in those areas which have been extensively treated with common insecticides.

In carrying out these tests, the compounds of the invention were tested side by side with 1,2-dicarbomethoxy-2-[S-(O,O-dimethyl)]-ethane dithiophosphate, a recognized miticidal agent. Side by side tests of this nature serve as a measure of the validity of the method. It was found that the compounds of the invention were highly active against Tetranychus bimaculata. For example, the compound di-[2-(dimethylthionophosphonothio)-ethyl]itaconate when used in an aqueous emulsion provided effective control of the mite in concentrations as low as 20 parts per million. Another compound tri-[3-(dimethylthionophosphonothio)-propyl]citrate, when identically tested, provided effective control in concentrations as low as 15 parts per million. Similar results were obtained with other compounds of the invention.

Mites present a peculiar control problem. Their life cycle is so short that there is nearly always a sufficiently high proportion of the population in the egg stage to render miticides which are effective only against the nymph or adult stage of the mite unsatisfactory. Thus, a miticide which is lethal only towards nymph and adult mites does not give complete control, since the eggs which have not hatched, will hatch and the mite will mature after the miticide has disappeared from the plant. It is particular attribute of the compounds of this invention that they are active against all stages of the mite life cycle, including the egg.

Although the active agents of this invention can be used alone, it is more economical to use them in a dispersed form in a suitable extending agent.

In this disclosure and in the claims appended thereto, the term, "dispersed" is used in its widest possible sense. When it is said that the compounds of this invention are dispersed it means that the particles may be molecular in size and held in true solution in a suitable solvent. It means further, that the particle may be colloidal in size and dispersed through a liquid phase in the form of suspension or emulsions or in the form of particles held in suspension by wetting agents. It also includes particles which are dispersed in a semi-solid viscous carrier such as petrolatum or soap in which they may be actually dissolved in the carrier or held in suspension in the carrier with the aid of suitable emulsifying or wetting agents. The term, "dispersed" also means that the particles may be mixed with and spread throughout a solid carrier so that the mixture is in the form of powder or dust. The term, "dispersed" also includes mixtures which are suitable for use as aerosols including solutions, suspensions or emulsions of the agents of this invention in a carrier such as Freon which boils below room temperature at ordinary pressure.

The term, "extending agent" as used in this disclosure, and in the appended claims, includes any and all of those agents in which the compounds of the instant invention are dispersed. It includes, therefore, the solvents of a true solution, the liquid phase of suspensions, emulsions or aerosols, the semi-solid carrier of ointments and the solid phase of dust and powders.

It has been found that the compounds of this invention are active when dispersed in an extending agent at concentrations of 0.001 percent by weight or even lower. This concentration is effective when the dispersing agent is a liquid but it is preferred to use more concentrated mixtures when the dispersing agent is a semi-solid or a solid. This is because liquid dispersions which are, of course, suitable for use as sprays give a more intimate contact with the mites than the solid dispersions and, therefore, lower concentrations are more effective with liquid dispersions.

There are a number of solvents which can be utilized for the preparation of solutions, supensions or emulsions of the compounds of this invention. High boiling oils of vegetable origin such as castor oil or olive oil have been found to be suitable. Low boiling, more volatile solvents such as acetone, cyclohexanone, carbon tetrachloride, ethylene dichloride, tetrachloroethane, hydrogenated naphthalenes, alkylated naphthalenes, solvent naphtha and the like are also useful. Petroleum fractions, particularly kerosene, are especially useful. For certain applications it may be advantageous to resort to mixtures of solvents.

If the active agents are to be applied as aerosols, it is convenient to dissolve them in a suitable solvent and to disperse the resulting solution in a liquid such as Freon which boils below room temperature. For such applications it is better to employ true solutions of the active agent although it is possible to employ suspensions or emulsions of the active agent.

The agents of this invention are often dispersed either in the form of emulsions or suspensions, in an inert carrier such as water with the aid of a capillary active substance. Such capillary substances may be anion-active, cation-active or non-ionizing. There may be mentioned by way of example, natural or synthetic soaps, Turkey-red oil, fatty alcohol sulfonates, esters of fatty acids and the like. Other examples include high molecular weight quaternary ammonium compounds as well as condensation products of ethylene and propylene oxide with monohydric and polyhydric alcohols.

For use as a powder or dust the active ingredients of this invention are mixed with any of a number of extending agents either organic or inorganic in nature which are suitable for the manufacture of pulverulent preparations. This includes, for example, tricalcium phosphate, calcium carbonate, kaolin, bole, kieselguhr, talcum, calcined magnesia, boric acid and others. Materials of vegetable origin such as powdered cork, powdered wood and powdered walnut shells are also useful. These mixtures may be used in the dry form or, by the addition of wetting agents, the dry powder can be rendered wettable by water so as to obtain stable aqueous dispersions suitable for use as sprays.

For special purposes the agents of this invention can be worked into the form of a paste or an ointment by the use of such semi-solid extending agents as soap or petroleum jelly with or without the aid of solubility promotors and/or dispersing agents.

In all of the forms described above, the dispersions may be provided ready for use or they may be provided in a concentrated form suitable for mixing with other extending agents before use.

In all of these various dispersions the active pesticidal agents can be one of or a plurality of the compounds of this invention. The compounds may also be advantageously employed in combination with other pesticides including for example, insecticides, fungicides and bactericides. There may be mentioned by way of example, 1,1-bis-(p-chlorophenyl)-2,2,2-trichloroethane (DDT); the gamma isomer of benzene hexachloride; 2,2-bis-(p-methoxy phenyl)-1,1,1-trichloroethane (DMDT); or inorganic compounds such as salts of mercury, copper or arsenic, as well as finely divided sulphur. In this manner it is possible to obtain mixtures which are effective against a wide variety of pests.

The following examples are given solely for the purpose of illustration only and are not to be construed as limitations of this invention, many variations of which are possible without departing from the spirit or scope thereof.

EXAMPLE I

*Di[3-(dimethylthionophosphonothio) propyl] maleate*

Diallyl maleate (0.1 mole) in 100 ml. of benzene plus 0.2 mole of dimethyldithiophosphoric acid was heated under reflux for eighteen hours. It was cooled and concentrated in vacuo at room temperature to a viscous liquid residue. The residue was taken up in 150 ml. of benzene, washed once with 50 ml. of water, three times with 50 ml. of 10% sodium bicarbonate and again with a 50 ml. portion of water. The organic layer was separated and dried over anhydrous sodium sulfate, filtered and concentrated at 5 mm. of mercury for twelve hours at room temperature to leave the desired product as a residue.

EXAMPLE II

*Di[3-(diethylthionophosphonothio) propyl] fumarate*

Diallyl fumarate (0.1 mole in 100 ml. of toluene plus 0.4 mole of diethyldithiophosphoric acid was heated under reflux for twenty-four hours. It was cooled and concentrated in vacuo at room temperature to a viscous liquid residue. The residue was taken up in 100 ml. of toluene, washed once with 50 ml. of water, three times with 50 ml. portions of 10% sodium bicarbonate and again with a 50 ml. portion of water. The organic layer was separated and dried over anhydrous magnesium sulfate, filtered and concentrated at 5 mm. of mercury for twelve hours at room temperature to leave the desired product as a residue.

EXAMPLE III

*Di[3-(dimethylthionophosphonothio) propyl]itaconate*

Diallyl itaconate (0.1 mole) in 100 ml. of chloroform plus 0.2 mole of dimethyldithiophosphoric acid was heated under reflux for thirty-six hours. It was cooled and concentrated in vacuo at room temperature to a viscous liquid residue. The residue was taken up in 150 ml. of chloroform, washed once with 50 ml. of water, three times with 50 ml. of 10% sodium bicarbonate and again with a 50 ml. portion of water. The organic layer was separated and dried over anhydrous sodium sulfate, filtered and concentrated at 5 mm. of mercury for twelve hours at room temperature to leave the desired product as a residue.

EXAMPLE IV

*Tri[3-(dipropylthionophosphonothio) propyl] aconitate*

Triallyl aconitate (0.1 mole) in 100 ml. of carbon tetrachloride plus 0.3 mole of dipropyldithiophosphoric acid was heated under reflux for six hours. It was cooled and concentrated in vacuo at room temperature to a viscous liquid residue. The residue was taken up in 150 ml. of benzene, washed once with 50 ml. of water, three times with 50 ml. of 10% sodium bicarbonate and again with a 50 ml. portion of water. The organic layer was separated and dried over anhydrous magnesium sulfate, filtered and concentrated at 5 mm. of mercury for twelve hours at room temperature to leave the desired product as a residue.

EXAMPLE V

*Di[3-(di-n-butylthionophosphonothio) propyl] citraconate*

Diallyl citraconate (0.1 mole) in 100 ml. of heptane plus 0.2 mole of di-n-butyldithiophosphoric acid was heated under reflux for twenty hours. It was cooled and concentrated in vacuo at room temperature to a viscous liquid residue. The residue was taken up in 150 ml. of benzene, washed once with 50 ml. of water, three times with 50 ml. of 10% sodium bicarbonate and again with a 50 ml. portion of water. The organic layer was separated and dried over anhydrous sodium sulfate, filtered and concentrated at 5 mm. of mercury for twelve hours at room temperature to leave the desired product as a residue.

EXAMPLE VI

*Di[3-(Dimethylthionophosphonothio) propyl] malonate*

Diallyl malonate (0.1 mole) in 100 ml. of benzene plus 0.25 mole of dimethyldithiophosphoric acid was heated under reflux for twenty-four hours. It was cooled and concentrated in vacuo at room temperature to a viscous liquid residue. The residue was taken up in 150 ml. of benzene, washed once with 50 ml. of water, three times with 50 ml. of 10% sodium bicarbonate and again with a 50 ml. portion of water. The organic layer was separated and dried over anhydrous sodium sulfate, filtered and concentrated at 5 mm. of mercury for twelve hours at room temperature to leave the desired product as a residue.

EXAMPLE VII

*Di[3-(diethylthionophosphonothio) propyl] succinate*

Diallyl succinate (0.1 mole) in 100 ml. of o-xylene plus 0.3 mole of diethyldithiophosphoric acid was heated under reflux for twenty hours. It was cooled and concentrated in vacuo at room temperature to a viscous liquid residue. The residue was taken up in 150 ml. of benzene, washed once with 50 ml. of water, three times with 50 ml. of 10% sodium bicarbonate and again with a 50 ml. portion of water. The organic layer was separated and dried over anhydrous magnesium sulfate, filtered and concentrated at 5 mm. of mercury for twelve hours at room temperature to leave the desired product as a residue.

EXAMPLE VIII

*Di[3-(Dimethylthionophosphonothio) propyl] glutarate*

Diallyl glutarate (0.1 mole) in 100 ml. of toluene plus 0.27 mole of dimethyldithiophosphoric acid was heated under reflux for twenty-four hours. It was cooled and concentrated in vacuo at room temperature to a viscous liquid residue. The residue was taken up in 150 ml. of toluene, washed once with 50 ml. of water, three times with 50 ml. of 10% sodium bicarbonate and again with a 50 ml. portion of water. The organic layer was separated and dried over anhydrous sodium sulfate, filtered and concentrated at 5 mm. of mercury for twelve hours at room temperature to leave the desired product as a residue.

EXAMPLE IX

*Di[3-(dimethylthionophosphonothio) propyl] adipate*

Diallyl adipate (0.1 mole) in 100 ml. of benzene plus 0.2 mole of dimethyldithiophosphoric acid was heated under reflux for twenty-four hours. It was cooled and concentrated in vacuo at room temperature to a viscous liquid residue. The residue was taken up in 150 ml. of benzene, washed once with 50 ml. of water, three times with 50 ml. of 10% sodium bicarbonate and again with a 50 ml. portion of water. The organic layer was separated and dried over anhydrous sodium sulfate, filtered and concentrated at 5 mm. of mercury for twelve hours at room temperature to leave the desired product as a residue.

EXAMPLE X

*Tri[3-(dimethylthionophosphonothio) propyl] citrate*

Triallyl citrate (0.1 mole) in 100 ml. of toluene plus 0.35 mole of dimethyldithiophosphoric acid was heated under reflux for twenty-four hours. It was cooled and concentrated in vacuo at room temperature to a viscous liquid residue. The residue was taken up in 150 ml. of benzene, washed once with 50 ml. of water, three times with 50 ml. of 10% sodium bicarbonate and again with a 50 ml. portion of water. The organic layer was separated and dried over anhydrous sodium sulfate, filtered and concentrated at 5 mm. of mercury for twelve hours at room temperature to leave the desired product as a residue.

EXAMPLE XI

*Tri[3-(dimethylthionophosphonothio) propyl] tricarballylate*

Triallyl tricarballylate (0.1 mole) in 100 ml. of chlorobenzene plus 0.35 mole of dimethyldithiophosphoric acid was heated under reflux for twenty-four hours. It was cooled and concentrated in vacuo at room temperature to a viscous liquid residue. The residue was taken up in 150 ml. of chlorobenzene, washed once with 50 ml. of water, three times with 50 ml. of 10% sodium bicarbonate and again with a 50 ml. portion of water. The organic layer was separated and dried over anhydrous magnesium sulfate, filtered and concentrated at 5 mm. of mercury for twelve hours at room temperature to leave the desired product as a residue.

EXAMPLE XII

*Di[3-(diethylthionophosphonothio) propyl] itaconate*

Diallyl itaconate (0.1 mole) in 100 ml. of benzene plus 0.2 mole of diethyldithiophosphoric acid was maintained at a temperature of 60° C. for thirty-six hours. It was cooled and concentrated in vacuo at room temperature to a viscous liquid residue. The residue was taken up in 150 ml. of benzene, washed once with 50 ml. of water, three times with 50 ml. of 10% sodium bicarbonate and again with a 50 ml. portion of water. The organic layer was separated and dried over anhydrous sodium sulfate, filtered and concentrated at 5 mm. of mercury for five hours at room temperature to leave the desired product as a residue.

EXAMPLE XIII

*Di[2-(dimethylthionophosphonothio) ethyl] maleate*

To a stirred solution of 0.1 mole of ammonium dimethyldithiophosphate in 80 ml. of methanol was added, over 0.5 hour, 0.4 mole of di-(2-chloroethyl)maleate while maintaining the solution at the reflux temperature. Refluxing was continued for two hours and at the end of this period precipitated ammonium chloride was removed by filtration. The filtrate was concentrated in vacuo at room temperature to produce a residual oil. The residue was taken up in 100 ml. of benzene and the resulting solution washed twice with 25 ml. portions of water. The organic layer was separated and dried over magnesium sulfate. The drying agent was removed by filtration and the dried filtrate concentrated at 0.5 mm. of mercury for twelve hours at room temperature to leave the desired product as a residue.

EXAMPLE XIV

*Di[2-(diethylthionophosphonothio) ethyl] fumarate*

To a stirred solution of 0.1 mole of barium diethyldithiophosphate in 75 ml. of ethanol was added, over 0.25 hour, 0.23 mole of di-(2-bromoethyl) fumarate while maintaining the solution at the reflux temperature. Refluxing was continued for one hour and at the end of this period precipitated barium bromide was removed by filtration. The filtrate was concentrated in vaco at room temperature to produce a residual oil. The residue was taken up in 100 ml. of benzene containing 25 ml. of diethyl ether and the resulting solution washed twice with 25 ml. portions of water. The organic layer was separated and dried over sodium sulfate. The drying agent was removed by filtration and the dried filtrate concentrated at 0.5 mm. of mercury for twelve hours at room temperature to leave the desired product as a residue.

EXAMPLE XV

*Di[2-(dimethylthionophosphonothio) ethyl] itaconate*

To a stirred solution of 0.1 mole of ammonium dimethyldithiophosphate in 100 ml. of methyl ethyl ketone was added, over 0.25 hour, 0.3 mole of di-(2-chloroethyl) itaconate while maintaining the solution at the reflux temperature. Refluxing was continued for 1.5 hours and at the end of this period precipitated ammonium chloride was removed by filtration. The filtrate was concentrated in vacuo at room temperature to produce a residual oil. The residue was taken up in 100 ml. of benzene containing 25 ml. of diethyl ether and the resulting solution washed twice with 25 ml. portions of water. The organic layer was separated and dried over magnesium sulfate. The drying agent was removed by filtration and the dried filtrate concentrated at 0.5 mm. of mercury for twelve hours at room temperature to leave the desired product as a residue.

EXAMPLE XVI

*Tri[2-(dipropylthionophosphonothio) ethyl] aconitate*

To a stirred solution of 0.1 mole of potassium dipropyldithiophosphate in 100 ml. of methyl propyl ketone was added, over 0.5 hour, 0.45 mole of tri-(2-chloroethyl) aconitate while maintaining the solution at the reflux temperature. Refluxing was continued for two hours and at the end of this period precipitated potassium chloride was removed by filtration. The filtrate was concentrated in vacuo at room temperature to produce a residual oil. The residue was taken up in 100 ml. of toluene and the resulting solution washed twice with 25 ml. portions of water. The organic layer was separated and dried over sodium sulfate. The drying agent was removed by filtration and the dried filtrate concentrated at 0.5 mm. of mercury for twelve hours at room temperature to leave the desired product as a residue.

EXAMPLE XVII

*Di[2-(di-isobutylthionophosphonothio) ethyl] citraconate*

To a stirred solution of 0.1 mole of ammonium di-isobutyldithiophosphate in 100 ml. of hexanol was added over 0.5 hour, 0.25 mole of di-(2-chloroethyl) citraconate while maintaining the temperature at 110° C. Heating was continued for two hours and at the end of this period precipitated ammonium chloride was removed by filtration. The filtrate was concentrated in vacuo at room temperature to produce a residual oil. The residue was taken up in 100 ml. of benzene and the resulting solution washed twice with 25 ml. portions of water. The organic layer was separated and dried over magnesium sulfate. The drying agent was removed by filtration and the dried filtrate concentrated at 0.5 mm. of mercury for twelve hours at room temperature to leave the desired product as a residue.

EXAMPLE XVIII

*Di[2-(dimethylthionophosphonothio) ethyl] malonate*

To a stirred solution of 0.1 mole of sodium dimethyldithiophosphate in 100 ml. of isopropanol was added, over 0.25 hour, 0.25 mole of di-(2-bromoethyl) malonate while maintaining the solution at the reflux temperature. Refluxing was continued for 5 hours and at the end of this period precipitated sodium bromide was removed by filtration. The filtrate was concentrated in vacuo at room temperature to produce a residual oil. The residue was taken up in 100 ml. of heptane and the resulting solution washed twice with 25 ml. portions of water. The organic layer was separated and dried over sodium sulfate. The drying agent was removed by filtration and the dried filtrate concentrated at 0.5 mm. of mercury for twelve hours at room temperature to leave the desired product as a residue.

EXAMPLE XIX

*Di[2-(diethylthionophosphonothio) ethyl] succinate*

To a stirred solution of 0.1 mole of ammonium diethyldithiophosphate in 100 ml. of methyl ethyl ketone was added, over 0.5 hour, 0.2 mole of di-(2-chloroethyl) succinate while maintaining the solution at the reflux temperature. Refluxing was continued for two hours and at the end of this period precipitated ammonium chloride was removed by filtration. The filtrate was concentrated in vacuo at room temperature to produce a residual oil. The residue was taken up in 100 ml. of benzene and the resulting solution washed twice with 25 ml. portions of water. The organic layer was separated and dried over magnesium sulfate. The drying agent was removed by filtration and the dried filtrate concentrated at 0.5 mm. of mercury for twelve hours at room temperature to leave the desired product as a residue.

EXAMPLE XX

*Di[2-(dimethylthionophosphonothio) ethyl] glutarate*

To a stirred solution of 0.1 mole of ammonium dimethyldithiophosphate in 100 ml. of ethanol was added, over 0.1 hour, 0.25 mole of di-(2-chloroethyl) glutarate while maintaining the solution at the reflux temperature. Refluxing was continued for 0.5 hour and at the end of this period precipitated ammonium chloride was removed by filtration. The filtrate was concentrated in vacuo at room temperature to produce a residual oil. The residue was taken up in 100 ml. of benzene and tre resulting solution washed twice with 25 ml. portions of water. The organic layer was separated and dried over sodium sulfate. The drying agent was removed by filtration and the dried filtrate concentrated at 0.5 mm. of mercury for twelve hours at room temperature to leave the desired product as a residue.

EXAMPLE XXI

*Di[2-(dimethylthionophosphonothio) ethyl] adipate*

To a stirred solution of 0.1 mole of sodium dimethyldithiophosphate in 100 ml. of methyl ethyl ketone was added, over 0.5 hour, 0.2 mole of di-(2-chloroethyl) adipate while maintaining the solution at the reflux temperature. Refluxing was continued for one hour and at the end of this period precipitated sodium chloride was removed by filtration. The filtrate was concentrated in vacuo at room temperature to produce a residual oil. The residue was taken up in 100 ml. of benzene and the resulting solution washed twice with 25 ml. portions of water. The organic layer was separated and dried over sodium sulfate. The drying agent was removed by filtration and the dried filtrate concentrated at 0.5 mm. of mercury for twelve hours at room temperature to leave the desired product as a residue.

EXAMPLE XXII

*Tri[2-(dimethylthionophosphonothio) ethyl] citrate*

To a stirred solution of 0.1 mole of ammonium dimethyldithiophosphate in 100 ml. of methyl ethyl ketone was added, over 0.5 hour, 0.4 mole of tri-(2-chloroethyl) citrate while maintaining the solution at the reflux temperature. Refluxing was continued for three hours and at the end of this period precipitated ammonium chloride was removed by filtration. The filtrate was concentrated in vacuo at room temperature to produce a residual oil. The residue was taken up in 100 ml. portions of water. The organic layer was separated and dried over benzene containing 25 ml. of diethyl ether. The drying agent was removed by filtration and the dried filtrate concentrated at 0.5 mm. of mercury for twelve hours at room temperature to leave the desired product as a residue.

EXAMPLE XXIII

*Tri[2-(dimethylthionophosphonothio) ethyl] tricarballyate*

To a stirred solution of 0.1 mole of ammonium dimethyldithiophosphate in 100 ml. of n-butanol was added, over 0.25 hour, 0.45 mole of tri-(2-chloroethyl) tricarballylate while maintaining the solution at the reflux temperature. Refluxing was continued for 0.5 hour and at the end of this period precipitated ammonium chloride was removed by filtration. The filtrate was concentrated in vacuo at room temperature to produce a residual oil. The residue was taken up in 100 ml. of benzene and the resulting solution washed twice with 25 ml. portions of water. The organic layer was separated and dried over sodium sulfate. The drying agent was removed by filtration and the dried filtrate concentrated at 0.5 mm. of mercury for twelve hours at room temperature to leave the desired product as a residue.

Using the procedures described in the previous examples, the following compounds are prepared.

Di[3-(diethylthionophosphonothio) propyl] maleate.
Di[3-(dimethylthionophosphonothio) propyl] fumarate.
Di[3-(diethylthionophosphonothio) propyl] itaconate.
Di[3-(dipropylthionophosphonothio) propyl] itaconate.
Di[3-(dibutylthionophosphonothio) propyl] itaconate.
Tri[3-(dimethylthionophosphonothio) propyl] aconitate.
Tri[3-(diethylthionophosphonothio) propyl] aconitate.
Di[3-(diethylthionophosphonothio) propyl] citraconate.
Di[3-(diethylthionophosphonothio) propyl] maleate.
Di[3-(dimethylthionophosphonothio) propyl] succinate.
Di[3-(diethylthionophosphonothio) propyl) glutarate.
Di[3-(diethylthionophosphonothio) propyl] adipate.
Tri[3-(diethylthionophosphonothio) propyl] citrate.
Tri[3-(diethylthionophosphonothio) propyl] tricarballyate.
Di[2-(diethylthionophosphonothio) ethyl] maleate.
Di[2-(dimethylthionophosphonothio) ethyl] fumarate.
Di[2-(diethylthionophosphonothio) ethyl] itaconate.
Di[2-(dipropylthionophosphonothio) ethyl] itaconate.
Di[2-(dibutylthionophosphonothio) ethyl] itaconate.
Tri[2-(dimethylthionophosphonothio) ethyl] aconitate.
Tri[2-(diethylthionophosphonothio) ethyl] aconitate.
Di[2-(dimethylthionophosphonothio) ethyl] citraconate.
Di[2-(diethylthionophosphonothio) ethyl] citraconate.
Di[2-(diethylthionophosphonothio) ethyl] maleate.
Di[2-(dimethylthionophosphonothio) ethyl] succinate.
Di[2-(diethylthionophosphonothio) ethyl] glutarate.
Di[2-(diethylthionophosphonothio) ethyl] adipate.
Tri[2-(diethylthionophosphonothio) ethyl] citrate.
Tri[2-(diethylthionophosphonothio) ethyl] tricarballyate.

What is claimed is:

1. A compound selected from the group consisting of 2-dialkylthionophosphonothio substituted ethyl and 3-dialkylthionophosphonothio substituted propyl fully esterfied esters of di- and tricarboxylic acids, the carboxyl groups of said acids being attached to different carbon atoms of a straight chain residue containing up to four carbon atoms and selected from the group consisting of alkyl, alkylene and monohydroxylated alkyl and alkylene, the alkyl groups of said dialkylthionophosphonothio substituents containing up to four carbon atoms.

2. A pesticidal composition containing as its principal active ingredient a compound of claim 1 dispersed in an extending agent.

3. A pesticidal composition containing as its principal active ingredient a compound of claim 1 disposed in a solid extending agent.

4. A pesticidal composition containing as its principal active ingredient a compound of claim 1 dispersed in a semi-solid extending agent.

5. A pesticidal composition containing as its principal active ingredient a compound of claim 1 dispersed in a liquid extending agent.

6. A method of killing mites which comprises contacting said mites with a compound of claim 1.

7. Di[3-(dimethylthionophosphonothio) propyl] maleate.

8. Di[3-(diethylthionophosphonothio) propyl] fumarate.

9. Di[3-(dimethylthionophosphonothio) propyl] itaconate.

10. Tri[3-(dipropylthionophosphonothio) propyl] aconitate.

11. Di[3-(diethylthionophosphonothio) propyl] succinate.

References Cited in the file of this patent
UNITED STATES PATENTS

| | | |
|---|---|---|
| 2,710,301 | Morris | Sept. 30, 1955 |
| 2,791,574 | Lanham | May 7, 1957 |